(12) United States Patent
Bonforte et al.

(10) Patent No.: US 8,380,512 B2
(45) Date of Patent: Feb. 19, 2013

(54) NAVIGATION USING A SEARCH ENGINE AND PHONETIC VOICE RECOGNITION

(75) Inventors: Jeffrey Bonforte, San Francisco, CA (US); Gary Clayton, Daly City, CA (US); Victor Chen, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1077 days.

(21) Appl. No.: 12/045,365

(22) Filed: Mar. 10, 2008

(65) Prior Publication Data

US 2009/0228277 A1 Sep. 10, 2009

(51) Int. Cl.
*G10L 11/00* (2006.01)
(52) U.S. Cl. ............. 704/270; 704/1; 704/9; 704/275
(58) Field of Classification Search ........... 704/270, 704/275, 1, 9
See application file for complete search history.

(56) References Cited

U.S. PATENT DOCUMENTS

| | | | |
|---|---|---|---|
| 2002/0173956 A1* | 11/2002 | Hartley et al. | 704/231 |
| 2003/0130847 A1* | 7/2003 | Case | 704/260 |
| 2003/0216912 A1* | 11/2003 | Chino | 704/231 |
| 2005/0125376 A1* | 6/2005 | Curtis et al. | 707/1 |
| 2005/0125391 A1* | 6/2005 | Curtis et al. | 707/3 |
| 2006/0023945 A1* | 2/2006 | King et al. | 382/173 |
| 2006/0080102 A1* | 4/2006 | Roy et al. | 704/260 |
| 2006/0136393 A1* | 6/2006 | Abbott et al. | 707/3 |
| 2006/0149558 A1* | 7/2006 | Kahn et al. | 704/278 |
| 2007/0118279 A1* | 5/2007 | Kudo | 701/208 |
| 2007/0255702 A1* | 11/2007 | Orme | 707/5 |
| 2008/0071776 A1* | 3/2008 | Cho et al. | 707/5 |
| 2008/0242279 A1* | 10/2008 | Ramer et al. | 455/414.2 |
| 2009/0094033 A1* | 4/2009 | Mozer et al. | 704/251 |
| 2009/0112782 A1* | 4/2009 | Cross et al. | 706/45 |
| 2009/0228281 A1* | 9/2009 | Singleton et al. | 704/275 |

* cited by examiner

*Primary Examiner* — Douglas Godbold
(74) *Attorney, Agent, or Firm* — Hickman Palermo Truong Becker Bingham Wong LLP

(57) ABSTRACT

A method and apparatus for incorporating voice recognition into a search engine is provided. The phonetic voice recognition system lacking grammar and spell checking is used. The output of the phonetic voice recognition system is forwarded to a search engine. The search engine performs disambiguation and relevancy analysis based on past similar queries. Search engine user behavior is recorded to improve the accuracy. Recorded statistics are used to rank results pages.

16 Claims, 3 Drawing Sheets

NAVIGATION USING A SEARCH ENGINE AND PHONETIC VOICE RECOGNITION

FIELD OF THE INVENTION

The present invention relates to search engines, voice recognition, and navigation using voice recognition.

BACKGROUND

Search engines are very robust in dealing with misspelled queries. Large search engines contain components dedicated to analyzing history of user behavior in order to improve accuracy in handling misspelled query terms. Search engines can use previous queries to handle spelling mistakes. For example if a user misspells a query "Sun Francisco," a typical search engine would recognize "Sun Francisco" as "San Francisco" because the mistake has likely been made before by a number of past users. The search engine creates associations between query terms and a page that the user deems most relevant by recording which link the user clicked on. Alternatively the search engine attempts to explicitly correct the user's mistake by providing explicit suggestions in the "Did you mean:" format. Clicking on a "Did you mean: . . . " link results in a new search with a suggested alternate spelling.

Search engines are also capable of "disambiguating" or parsing queries to provide results of higher relevance. An indication that a result is relevant is occurs when a user clicks on the result in a search page, and then does not come back to the search page. Search engines are capable of providing relevant results by extracting logical meaning from queries. For example, an input query of the form "best city street restaurant cuisine" can actually be interpreted by the search engine as "What is the best cuisine restaurant in city on street." More specifically, an unstructured query "best Indian restaurant Potrero Hill", results in a search engine constructing a complex logical statement. The query is interpreted as a search for "Indian restaurants" within the "Potrero Hill" neighborhood in San Francisco. The query is run against business listings within the "Potrero Hill" neighborhood and the results are returned to the user. Moreover, it is possible to misspell every word in the query, because the search engine is capable of recognizing and correcting the misspellings. The search engine does not use spell checking to correct the misspellings, where instead search engines look at past user behavior, i.e. relevant links are obtained by looking at previously established relevant pages for previous queries of similar types.

Voice recognition systems (VRS) are faced with the same set of challenges as search engines. At a high level, voice recognition systems attempt to map differing user word pronunciations to a "dictionary" or a "grammar." Voice recognition accuracy is directly proportional to the size of the grammar (i.e. the number of distinct utterances that the voice recognition system is supposed to recognize). Specifically, the more limited the grammar, the more accurate the voice recognition system is.

Typically, a voice recognition system would handle a query such as the one given in the previous example (searching for a restaurant) by limiting a grammar through the use of a decision tree. When using a decision tree, a VRS uses a hierarchy to reduce both grammar and vocabulary. At every level of the hierarchy, the grammar used to recognize speech is limited, and therefore the vocabulary is limited.

For example, a voice recognition system dialogue may proceed as follows. The voice recognition system initially asks a user "What can I do for you?". The user may reply, "I want to find a restaurant." The VRS may process this answer against a grammar that is limited to a selected set of "top-level" terms. In this example, the grammar against which the first response is processed may include the word "restaurant". In response to recognizing the word "restaurant", the VRS may respond: "I hear a restaurant", and then ask "In what city?" The user may respond "San Francisco". The VRS then attempts to identify "San Francisco" using a grammar that is limited to names of cities. The VRS may then ask: "In what neighborhood?" When the user responds, the VRS then may attempt to identify the neighborhood specified in the user's answer using a grammar that is limited to names of neighborhoods within San Francisco. This process may be repeated until the VRS has enough information about the question to finally provide an answer.

As illustrated by the preceding dialog, a VRS that uses a decision tree forces the user to answer multiple questions to traverse the decision tree until finally arriving at an answer. Such an interface is frustrating because users have to wait for the correct dialog instead of speaking the query naturally. Users find it easier to give all of the pertinent information in one complex statement.

Another way a VRS system may improve accuracy is by reducing the number of responses a user may give, effectively reducing the size of the dictionary. A VRS where there are three possible responses "Yes", "No", and "I don't know", is far more accurate than a VRS where the number of options is infinite. Limiting the number of responses a user may give naturally creates hierarchical application structures that continuously reduce the "grammars". Such limitations are awkward for the user, because rigid structures are not normally used and therefore seem inefficient.

Accurate voice recognition requires large computational resources, and therefore current voice recognition implementations are very costly. In phone-based systems, every step in traversing a decision tree may cost 1 to 1.5 cents. Computational resources are expended on comparing previously-recorded waveform samples to the waveform that was captured. Further, input samples of a VRS are more variable, for example, than the input of text-based search engines.

General purpose voice recognition systems are fairly accurate, but at times VRS can make major errors. The source of the errors stems from the fact that the VRS performs relevance analysis based on which words belong next to each other. For example, if one were to say "I'm better", a typical VRS would look for words that follow such as "than" or "with" So the voice recognition attempts to simplify the recognition computation by using the vocabulary that is typically used around a specific keyword. On the other hand, search engines cannot rely on such logic because a lot of the queries are seemingly random. For example consider the query "What did ayatollah do?" A voice recognition system most likely will not have the word "ayatollah" in its vocabulary, and therefore will not recognize the word. However a search engine would have been able to recall relevant pages, even if the word "ayatollah" is misspelled.

Previous attempts to improve the accuracy of a voice recognition system focused on a combination of approaches such as augmenting the structure of the voice recognition application to reduce the vocabulary of the user, or restricting the grammar of the user, or on expanding the number of words the voice recognition is able to recognize. Such approaches are limited because the voice recognition system once compiled is fixed and is unable to update dynamically, only to tailor itself to a particular speaker.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
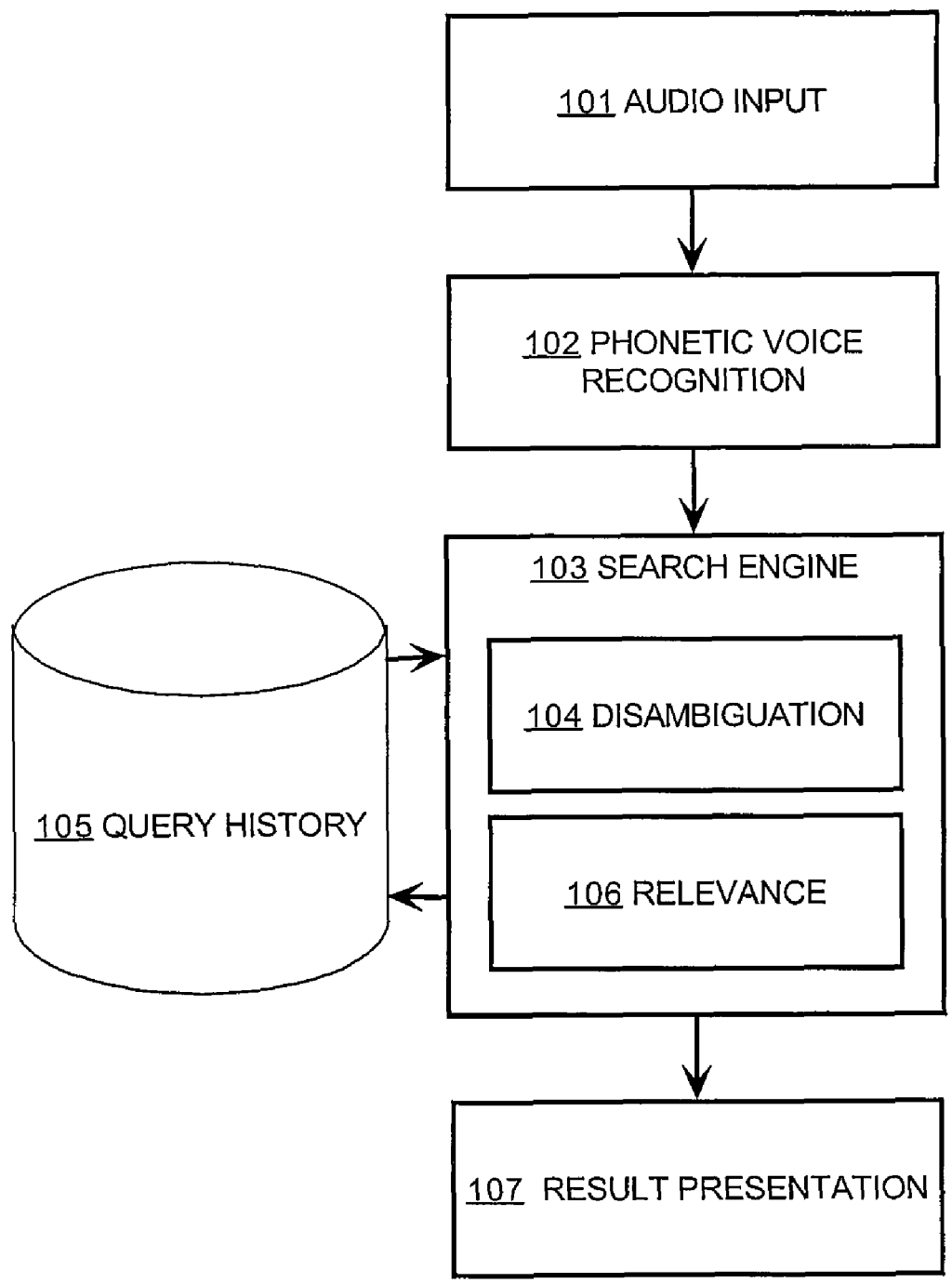
FIG. 1 is a diagram of a voice recognition enabled search system, according to an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

A system is described herein which allows users to submit queries to a search engine by speaking instead of typing. The system includes a phonetic voice recognition system coupled to a search engine. In one embodiment, the search engine has query disambiguation and relevance determination capabilities. The phonetic voice recognition system, on the other hand, may lack grammar and spell checking, and may simply produce output text as it is "heard" by the system without interpretation. A combination of a full featured search engine and a rudimentary voice recognition system results in a voice recognition system which has a much higher accuracy.

Disambiguation, relevance, and self-correction, provided by the search engine, when applied to voice recognition, allow users to talk naturally, rather than follow hierarchical menus. Limiting the depth of hierarchical menus or eliminating hierarchical menus allows for simplified user interfaces. The voice-recognition-enabled search system described herein gains accuracy as more transcribed text is input and as users actively provide feedback. The voice recognition application will not have to be tuned to the pronunciation of a particular speaker as it would normally.

In one embodiment, an audio query is processed by the phonetic voice recognition system, which outputs text. The text output of the phonetic voice recognition system is forwarded to a search engine. The search engine performs recall, disambiguation, and relevancy analysis, and ranks the results based, at least in part, on past similar queries performed by other users.

In one embodiment, the search engine presents a set of result pages to the user, the set of resulting pages my also include a "Did you mean:" link. The "Did you mean:" link may have an alternate spelling of query terms or a related topic. The search engine records whether the user visited the "Did you mean:" link, as well as pages the user visited for the particular query and the ultimate destination page. The query term or terms generated by the phonetic voice recognition system are associated with pages that the user visited. The query terms can then be used in recall, disambiguation, relevancy analysis, as well as ranking of the search results of future searches.

Search engines are able to provide highly relevant results because search engines contain components that are capable of gracefully handling misspelled queries. People predictably misspell words and hence misspell queries in a predictable manner. Typically, in order to spell a difficult word, a person would sound out the word. Analogously people mispronounce words in a consistent manner. Applying phonetic voice recognition to mispronounced words results in an output text that is misspelled consistently. For example a query for a Seattle Seahawks football player named "Tazio Franakowski" maybe interpreted by a phonetic voice recognition system "see attle seahauks kicker tassio francowski". The search engine would understand the query, due to similar spelling mistakes made by VRS.

Interface of a Voice Recognition System and a Search Engine

FIG. 1 depicts a voice recognition enabled search system 100, according to an embodiment of the present invention. The voice recognition enabled search system 100 takes an audio input 101. Audio input 101 can come from a number of different sources, such as from an audio file, or directly from an A/D converter. The audio input 101 data can be compressed or simply PCM data. Audio input 101 data is forwarded to a phonetic voice recognition 102 component, where the data is converted to text. The phonetic voice recognition 102 component does not attempt to recognize distinct words, nor does the phonetic recognition 102 component perform spell checking. The unmodified text is forwarded to a search engine 103, where the text is processed in the same manner as if the same text query was entered into a search box. In the event that a query is misspelled, or query terms are interpreted to have several different meanings, the disambiguation component 104 searches the query history database 105 to determine whether there were similar queries performed in the past and what links if any were ultimately followed by users.

The relevance component 106 assigns relevance scores to pages that were recalled. There are many factors that go into relevance analysis, such as the type of pages that contain links to the recalled pages, hyperlink graph properties, the number of times a page has been the ultimate destination according to the query history database 105, and so on. Some of the techniques of relevance analysis are presented in U.S. patent application Ser. No. 11/724,559, titled ""Query-Log Match" Relevance Features", which is incorporated by reference in its entirety. The set of resulting links to pages 107 are presented to the user.

Accuracy Verification

In one embodiment of the present invention, the accuracy of the search results may be verified by using a speech-to-text component and asking a question with a limited range of answers such as "yes" or "no". For example, if a user searched for a "best pizza restaurant in Sunnyvale", the voice enabled search may verify the answers by presenting the topmost result in the form "I just found you the best pizza restaurant in Sunnyvale: Vito's Pizza, Is this correct?" In the case in which a user answers "yes", the restaurant page will be displayed to the user. Moreover, the page will be associated with the query. In the case in which the page was already associated with the query, the page's frequency score will be updated. In the case in which the user answers "no", a set of results may be simply be presented to the user, so that the user may manually select the most relevant result.

The Query History Database

As the user examines the set of results and follows any links, the query history database 105 is updated to reflect the user's navigation history. The query history database 105 also contains information relating to queries submitted by past users as well as information about the links the past users ultimately followed. Query history database 105 contains misspelled queries and also maintains information such as how often any given link has been followed given a set of query terms, and so on. The query history database 105 is dynamically updated as the search engine 103 processes queries. Text of the query and information such as the time of the query, frequency, and pages visited is recorded. Such updates allow for adjustment of search engine behavior. For example, misspelled queries could be associated with pages that past users visited but never left, for such association allows pages to be recalled which do not necessarily contain the misspelled query terms, yet are relevant. Another adjustment to the search engine uses query frequency data to adjust result order and to present the most popular results first.

Navigating to Applications or Pages

A voice recognition system coupled to a search engine can be used to navigate applications. For example, a user may want to navigate to a web based mail client through a search engine. The user may submit a query term "mail" to the search engine search box is "mail." The search engine is used to navigate to the mail site, instead of directly specifying the mail site address. Similarly, a user may navigate to the "inbox". Another example of navigation using voice is a query "what is the best Indian restaurant in San Francisco" in which the search engine navigates to a page that contains a listing of the available restaurants with rankings. To achieve such functionality in a voice recognition software alone would require an immense amount of programming. Voice assisted search engine allows for creating of simpler applications, and obviates any need to control grammar and vocabulary.

Coupling of a voice recognition system with a search engine shifts the computational overhead of disambiguation of the text generated by the voice recognition system to the search engine. The search engine is capable of correcting the majority of mistakes generated by the voice recognition system which otherwise would have been handled by the voice recognition system logic. The decrease in processing dedicated to voice recognition lowers the overall system cost.

System Updates

Search engine index and query history database 105 are continuously updated, as opposed to a vocabulary and grammar that is preprogrammed into a voice recognition system. Typically, a search engine will contain a web crawler component that is used to automatically collect information from various documents on the Web. Web crawlers visit pages and continuously add to or update content of search engine index. Web crawlers follow a number of strategies for revisiting existing pages, or discovering new pages. For example a web crawler may visit finance pages to get the latest stock prices once a day, while the web crawler may explore university pages once a week to capture the new content.

A search aided voice recognition system that is implemented as described herein is capable of providing current information which would not necessarily be available in a standalone voice recognition system. One such example is a user attempting to get a stock price quote for a company planning for an initial public offering. If the company ticker symbol or name was not programmed into a voice recognition system at design time of the voice recognition system, then the voice recognition system would be unable to recognize the name of the company and therefore be unable to answer the user's query. A search engine index, on the other hand, is constantly updated with financial information, and a query in the form of "what is the price of ticker symbol" will generate a set of results including the price of the chosen stock. A graph of the chosen stock performance may also be automatically included in the result set.

Audio Query Processing Example

Figure 2:
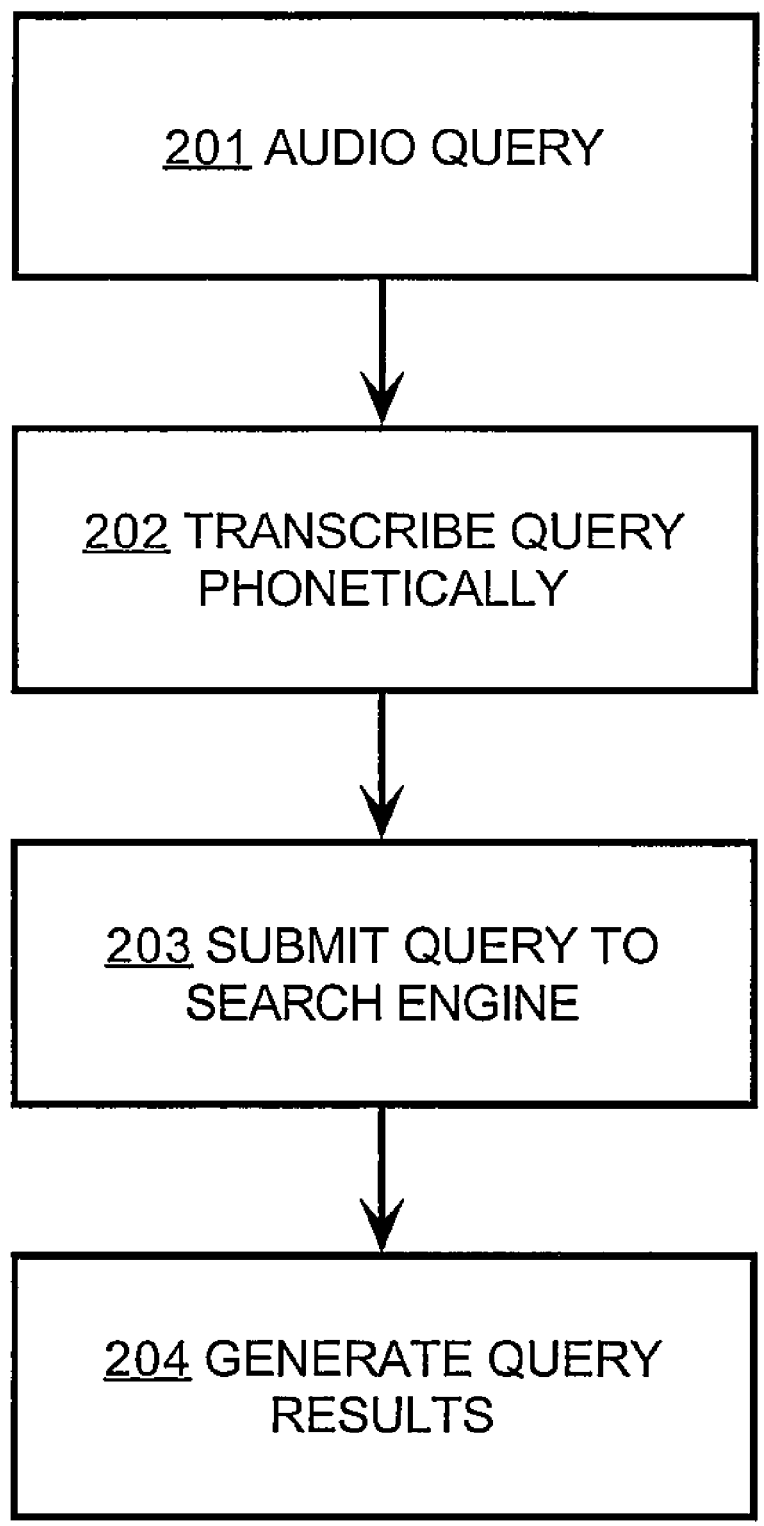
FIG. 2 is a flow diagram of steps performed by a voice recognition enabled search system to translate an audio query into a set of results, according to an embodiment of the present invention.

FIG. 2 depicts the steps taken as an audio query is submitted, according to an embodiment of the invention. Referring to FIG. 2, a user submits an audio query in step 201. The user may simply talk into a microphone. For the purpose of explanation, assume that the user submitted the audio query "Seattle Seahawks kicker Tazio Franakowski". In step 202 the audio query is phonetically transcribed by a speech-to-text component. In the present example, the speech-to-text component may generate the text "see attle seahauks kicker tassio francowski".

The output of the speech-to-text component is submitted to a search engine in step 203. Thus, in the present example, the search engine would receive the text "see attle seahauks kicker tassio francowski". The query text is processed by the search engine. Query text processing is dependent on the implementation of the search engine; however there are several common procedures.

One procedure is application of disambiguation logic to the query text. Disambiguation attempts to resolve queries that can have several meanings. In the above example, is the user looking for a biography or game statistics. There exist a number of disambiguation techniques; one such technique is described in U.S. patent application Ser. No. 11/270,917, titled "Word Sense Disambiguation," which is incorporated by reference in its entirety.

In another procedure, the main index is examined for the existence of the search terms. The main index database contains term-page reference associations. Every term-page association contains a vector of ranks which can be later used to order the search results. Using the example query, the index is searched for the entire query as well as constituents of the query.

Query results are then generated in step 204, using one or more of the following techniques. One technique involves reviewing the query history database 105 to determine whether similar searches were performed in the past. For example, if a term that is misspelled "seahauks," has an entry in the query history database 105, the pages associated with the query for "seahauks" are included in the set of results.

Another technique leverages the user's search history to provide improved results. For example, consider the situation in which after disambiguation, the text of an audio query is determined to be either "bug car" or "bacar." However, the user's recent search history includes searches for businesses in San Francisco. Based on this search history, results for the restaurant "Bacar" are included in the set of results.

Finally, in step 204 the set of results is ordered according to multiple factors, including one or more of the following: past query history, pre-computed relevance of result constituents, number of matched terms from the query.

Hardware Overview

Figure 3:
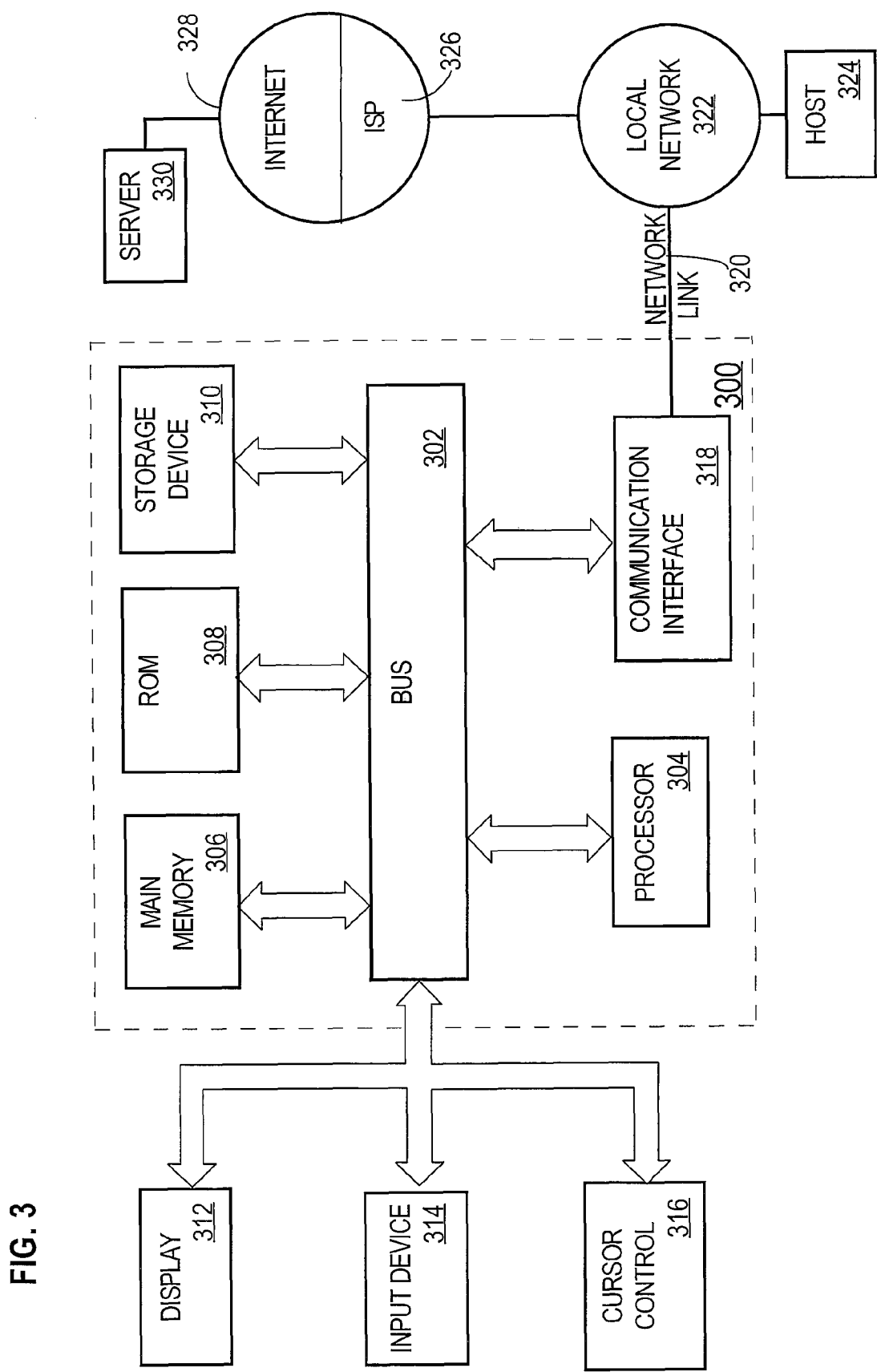
FIG. 3 is an example computer system upon which embodiments of the present invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising the steps of:
   receiving, at a search engine, a phonetically-spelled string;
   wherein the phonetically-spelled string is the result of transforming an audio input into the phonetically-spelled string that has not been converted into any predetermined set of correctly-spelled words;
   identifying one or more previously-submitted phonetically-spelled query strings from a plurality of other users based on the phonetically-spelled string; and
   generating a set of query results based, at least in part, on the phonetically-spelled string and on the one or more previously-submitted phonetically-spelled query strings;
   wherein the steps of the method are performed by one or more computing devices.

2. The method of claim 1 wherein transforming the audio input into the phonetically-spelled string is performed by a phonetic voice recognition component.

3. The method of claim 1 wherein transforming the audio input into the phonetically-spelled string includes disambiguating the phonetically-spelled string.

4. The method of claim 1 including a further step of recording one or more addresses of pages visited by a user, wherein each page was provided to the user in one or more previous search results.

5. The method of claim 4 wherein the set of query results is ordered, at least in part, using the recorded addresses.

6. The method of claim 1 including a further step of prompting a user for an indication of which query result of the set of query results is a best result.

7. The method of claim 6 wherein the step of prompting the user includes:
   transforming a part of a selected result, from the set of results, from text to speech; and
   sending an audio prompt to the user, wherein the audio prompt includes audio that corresponds to the part of the selected result.

8. The method of claim 1 wherein the set of query results is ordered based, at least in part, on past strings recorded by the search engine.

9. A non-transitory computer-readable storage medium storing one or more sequences of instructions, wherein execution of the one or more sequences of instructions by one or more processors causes the one or more processors to perform the steps of:
   receiving, at a search engine, a phonetically-spelled string;
   wherein the phonetically-spelled string is the result of transforming an audio input into the phonetically-spelled string that has not been converted into any predetermined set of correctly-spelled words;
   identifying one or more previously-submitted phonetically-spelled query strings from a plurality of other users based on the phonetically-spelled string; and
   generating a set of query results based, at least in part, on the phonetically-spelled string and on the one ore more previously-submitted phonetically-spelled query strings;
   wherein the steps of the method are performed by one or more computing devices.

10. The non-transitory computer-readable storage medium of claim 9, wherein transforming the audio input into the phonetically-spelled string is performed by a phonetic voice recognition component.

11. The non-transitory computer-readable storage medium of claim 9, wherein transforming the audio input into the phonetically-spelled string includes a step of disambiguating the phonetically-spelled string.

12. The non-transitory computer-readable storage medium of claim 9, wherein execution of the one or more sequences of instructions by the one or more processors causes the one or more processors to further perform the step of: recording one or more addresses of pages visited by a user, wherein each page was provided to the user in one or more previous search results.

13. The non-transitory computer-readable storage medium of claim 12, wherein the set of query results are ordered, at least in part, using the recorded addresses.

14. The non-transitory computer-readable storage medium of claim 9, wherein execution of the one or more sequences of instructions by the one or more processors causes the one or more processors to further perform the step of: prompting a user for an indication of which query result of the set of query results is a best result.

15. The non-transitory computer-readable storage medium of claim 14, wherein prompting the user includes:
   transforming a part of a selected result, from the set of results, from text to speech; and
   sending an audio prompt to the user, wherein the audio prompt includes audio that corresponds to the part of the selected result.

16. The non-transitory computer-readable storage medium of claim 9, wherein the set of query results is ordered based, at least in part, on past strings recorded by the search engine.

* * * * *